(12) United States Patent
Srivastava et al.

(10) Patent No.: US 8,495,021 B2
(45) Date of Patent: Jul. 23, 2013

(54) DISTRIBUTION DATA ITEMS WITHIN GEOGRAPHICALLY DISTRIBUTED DATABASES

(75) Inventors: Utkarsh Srivastava, Fremont, CA (US); Arvind Thiagarajan, Cambridge, MA (US)

(73) Assignee: Yahoo! Inc., Sunnyvale, CA (US)

(*) Notice: Subject to any disclaimer, the term of this patent is extended or adjusted under 35 U.S.C. 154(b) by 325 days.

(21) Appl. No.: 12/324,453

(22) Filed: Nov. 26, 2008

(65) Prior Publication Data

US 2010/0131545 A1  May 27, 2010

(51) Int. Cl.
*G06F 17/30* (2006.01)
*G06F 7/00* (2006.01)

(52) U.S. Cl.
USPC .......... 707/640; 707/759; 707/769; 707/781; 707/919

(58) Field of Classification Search
None
See application file for complete search history.

(56) References Cited

U.S. PATENT DOCUMENTS

| | | | | |
|---|---|---|---|---|
| 5,873,085 | A | * | 2/1999 | Enoki et al. .......................... 1/1 |
| 5,987,506 | A | * | 11/1999 | Carter et al. .................. 709/213 |
| 6,073,141 | A | * | 6/2000 | Salazar ................................. 1/1 |
| 6,145,066 | A | * | 11/2000 | Atkin ............................ 711/165 |
| 6,430,694 | B1 | * | 8/2002 | Hosein et al. ................. 713/400 |
| 7,483,926 | B2 | * | 1/2009 | Chandhok et al. ............ 707/655 |
| 7,657,578 | B1 | * | 2/2010 | Karr et al. ..................... 707/610 |
| 7,840,557 | B1 | * | 11/2010 | Smith et al. ................... 707/722 |
| 8,094,560 | B2 | * | 1/2012 | Bagepalli et al. ............. 370/235 |
| 2002/0042818 | A1 | * | 4/2002 | Helmer et al. ................ 709/217 |
| 2007/0162462 | A1 | * | 7/2007 | Zhang et al. .................... 707/10 |
| 2008/0162609 | A1 | * | 7/2008 | Bigian et al. ................. 707/205 |
| 2010/0076933 | A1 | * | 3/2010 | Hamilton et al. ............. 707/640 |

OTHER PUBLICATIONS

U.S. Appl. No. 11/948,221, filed Nov. 30, 2007, Feng et al.

* cited by examiner

*Primary Examiner* — Jung Kim
*Assistant Examiner* — James J Wilcox
(74) *Attorney, Agent, or Firm* — Berkely Law & Technology Group, LLP

(57) ABSTRACT

The subject matter disclosed herein relates to distribution data items within geographically distributed databases.

20 Claims, 3 Drawing Sheets

DISTRIBUTION DATA ITEMS WITHIN GEOGRAPHICALLY DISTRIBUTED DATABASES

BACKGROUND

1. Field

The subject matter disclosed herein relates to data processing, and more particularly to methods and apparatuses that may be implemented to distribute data items within geographically distributed databases through one or more computing platforms and/or other like devices.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

Certain databases may be managed by multiple servers, and may often be replicated to geographically scattered locations. In one example, a user database may be maintained for a web based platform, containing user logins, authentication credentials, preference settings for different services, and so on. Such a database may be accessed indirectly by users logged into multiple web services. To improve continuity and efficiency, a single replica of such a database may be partitioned over a plurality of servers in a given data center, and replicas may be stored in data centers in the U.S., Europe and Asia.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
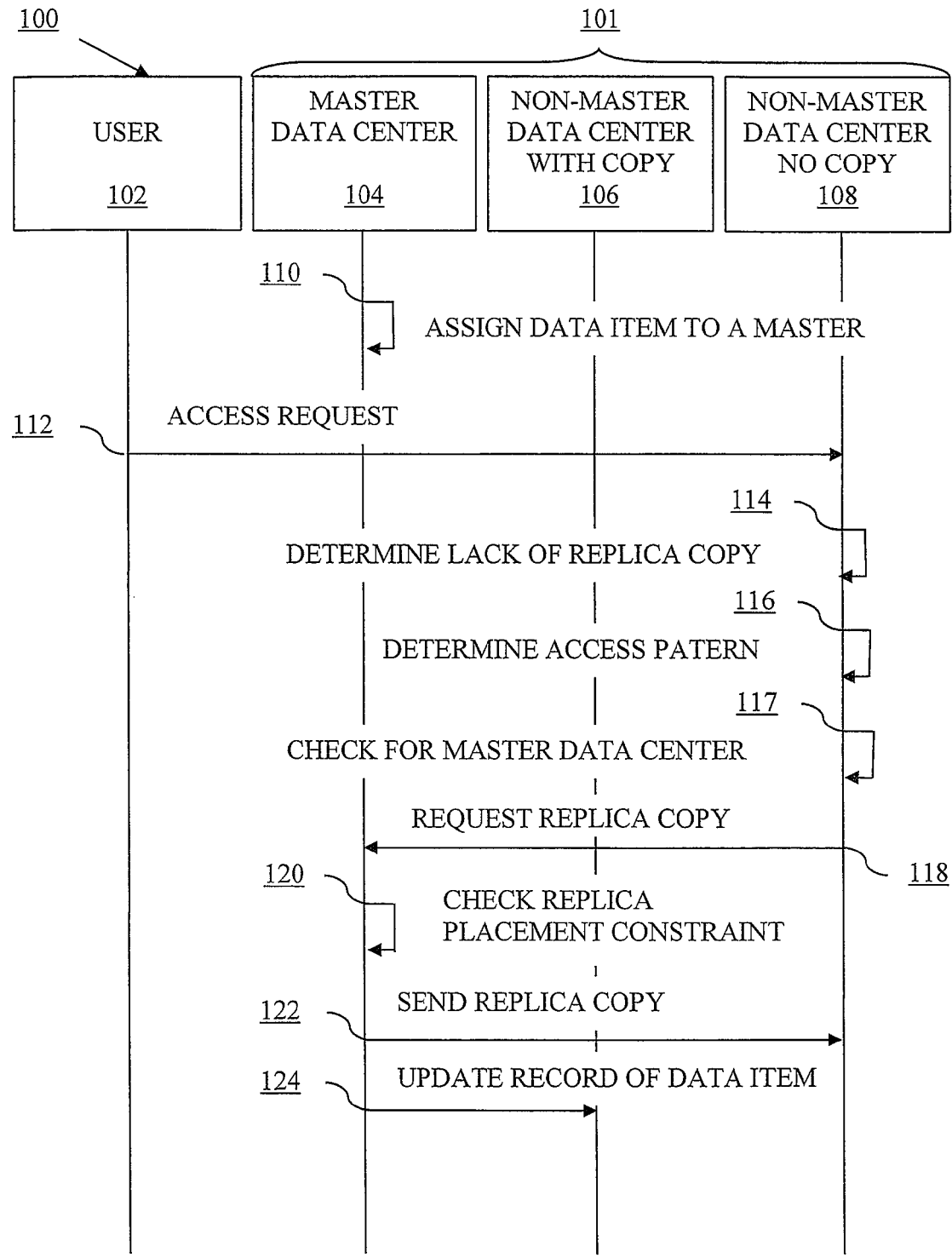
FIG. 1 is a procedure for modifying distribution of data items within a geographically distributed database in accordance with one or more exemplary embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As will be described in greater detail below, methods and apparatuses may be implemented for adaptive placement of replica copies of data items within a geographically distributed database. Such adaptive placement of replica copies of data items may be subject to constraints on user request latency and/or constraints on minimum redundancy requirements for recoverability. Such adaptive placement of replica copies of data items may be designed to reduce bandwidth and/or disk resource consumption.

As used herein, the term "data item" may include any information in a digital format, of which at least a portion may be perceived in some manner (e.g., visually, audibly) by a user if reproduced by a digital device such as, for example, a computing platform. For one or more embodiments, a data item may comprise a web page coded in a markup language, such as, for example, HTML (hypertext markup language), and/or the like. However, the scope of claimed subject matter is not limited in this respect. Also, for one or more embodiments, the data item may comprise one or more elements. Such elements in one or more embodiments may comprise text, for example, as may be displayed as part of a web page presentation. Also, for one or more embodiments, such elements may comprise a graphical object, such as, for example, a digital image. In a particular implementation, a web page may contain embedded references to images, audio, video, other web documents, etc. One common type of reference used to identify and locate resources on the web is a Uniform Resource Locator (URL).

As geographic barriers to personal travel and/or information usage decrease, there may be an increasing utilization of both user data and/or applications from geographically dispersed areas of the globe. For example, a geographically distributed database may serve a large number of geographically dispersed users and/or communities. As used herein, the term "geographically distributed database" may include multiple data centers located among various geographic regions. Such data centers may include a storage unit to store a set of data items. An individual data center may store its own replica copy of a set of data items and individual data centers may be associated with a field that may indicate which data center is assigned to be a "master" regional data center for that particular data item. As used herein, the term "master" may refer to a regional data center that is capable of managing editing operations on individual data items assigned to that particular data center. For example, individual data items (or "record") may be replicated in one or more regional data center, which may contain a replica copy of such data items. Individual data items may be assigned a "master" regional data center through which updates to such data items may be ordered to maintain consistency. Such a master regional data center may be chosen adaptively based at least in part on the locations of the last few updates to individual data items. Since individual data centers may be geographically distributed, a first data item may be more efficiently edited with the master being a first data center associated with a first geographic region while another data item, possibly belonging to a different user, may be more efficiently edited with the master being a second data center associated with a second geographic region.

Such a geographically distributed database may be requested to serve requests from any part of the globe with low latency. This may involve placing multiple replica copies of data items in various data centers around the world. At the same time, maintaining replica copies of a data item at every possible data center or location may not be feasible owing to constraints on network bandwidth, disk bandwidth and/or disk storage. Adaptive placement may be utilized to address such constraints, where individual data items may be stored at a judicious set of portions of the geographically distributed database based at least in part on the basis of its access patterns for one or more data items with respect to different geographic regions. As used herein, the term "access patterns" may include a quantification of read-type access requests, update type-access requests, and/or the like, and/or combinations thereof. Such an access pattern may include access requests from one or more users made with respect to a given data items on a data center by data center basis within a geographically distributed database.

Such an access pattern may be determined for a given data item within a geographically distributed database. For example, such a determination of an access pattern may include determining a local read rate for a given data item associated with a given regional data center. As used herein the term "local read rate" may refer to a quantification of the amount of access associated with a given data item at such a regional data center. For example, a web page-type data item for an online community that has an access pattern indicating frequent read-type access requests (or local read rate) in both the UK and in Singapore may be replicated at data centers in both locations to provide decreased latency access for requests from these regions.

Additionally or alternatively, such a determination of an access pattern may include determining a value function for a given data item associated with a given regional data center. As used herein the term "value function" may refer to an association of read rate, update rate, and/or read count for individual data items that may be capable of quantifying which replica copies of a data item may be least likely to negatively impact latency in responses from a given regional data center. Such a value function may be utilized to sort individual replica copies at individual regional data centers in terms of order of importance. For example, in situations where a web page-type data item has an access pattern indicating frequent write-type access requests by UK users, propagating each update of the web page-type data item to the data center in Singapore may consume network bandwidth on a higher cost cross-country link. Depending on the particular access pattern associated with the web page-type data item in Singapore, it may or may not be worth this cost to maintain a replica copy of the web page-type data item in Singapore.

The problem of replica copy placement may be challenging for several reasons. First, an optimal set of locations for a given data item may change over time owing to changes in the access pattern for the data item. This means that the strategy of choosing a statically determined set of locations to replicate an item at the time of creation may not be well suited for many situations. For example, consider a user whose home page-type data item is initially replicated in a UK data center. In a situation where the user moves from the UK to Singapore, a modification to the distribution of data items within the geographically distributed data base may be based at least in part on determining an access pattern associated with this home page-type data item. Such a change in an access pattern associated with this home page-type data item may be detected and utilized to create a replica copy for such a home page-type data item in Singapore, and/or utilized to delete the UK replica copy. Costs associated with not being adaptive with respect to modifications to the distribution of data items within a geographically distributed data base may be small for individual data items, but may be large in the aggregate over thousands or millions of data items.

Second, as mentioned above, such tracking of access patterns of individual data items may be utilized to select an appropriate placement for individual data items within a geographically distributed data base. A given regional data store of a geographically distributed data base may serve requests for millions of data items. In such a case, it may be challenging to maintain persistent statistics of access patterns at a fine-grained per-data item basis. For example, one strategy of storing an access count on disk with each data item may involve an addition disk seek and write for individual data item reads. It may be possible to keep some in-memory statistics regarding access counts, but these may be subject to a space constraint because such access counts may consume valuable memory space that might normally be used to cache data items on serving machines. Accordingly, it may be useful to design an adaptive replication procedure for modifying distribution of data items within a geographically distributed database, where such a procedure may be memory-efficient and/or may maintain approximate statistics subject to a space constraint.

Third, achieving an improved placement of replica copies for data items within a geographically distributed database might involve a single agent having a global view of the entire geographically distributed database, including read and update access patterns for individual data items from individual regions. Further, such a single agent may also have knowledge of what data item replica copies currently exist in a geographically distributed database. However, it may not be feasible in a geographically distributed database for any single regional data center to have a global view of this type of information. For example, exchanging per-data item access pattern statistics and/or other information to construct such a global view may be prohibitively expensive. In this setting, the challenge may be to design a distributed procedure for modifying distribution of data items within a geographically distributed database with reduced coordination across regional data centers. For example, such a procedure for modifying distribution of data items within a geographically distributed database may maintain primarily local statistics on a regional data center basis in order to minimize coordination overhead and/or in order to facilitate local decisions to add, maintain and/or delete replica copies at individual regional data centers.

FIG. 1 is an illustrative flow diagram of a process 100 which may be utilized for modifying distribution of data items within a geographically distributed database in accordance with some embodiments of the invention. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter. Procedure 100 depicted in FIG. 1 may in alternative embodiments be implemented in software, hardware, and/or firmware, and may comprise discrete operations.

As illustrated, procedure 100 governs the operation of a geographically distributed database 101 associated with a user device 102. Geographically distributed database 101 may include multiple components. For example, geographically distributed database 101 may include a number of regional data centers 104/106/108. By way of example, but not limitation, a first regional data center is illustrated as a master regional data center 104 that may be capable of managing modifications in the distribution of a given data item within geographically distributed database 101. Additionally or alternatively, a second data center is illustrated as a non-master regional data center 106 that may contain a replica copy of such a given data item. Lastly, a third data center is illustrated as a non-master regional data center 108 that may not contain a replica copy of such a given data item. Instead, non-master regional data center 108 may contain a truncated reference (referred to herein as a "stub") to such a given data item that may include information regarding the current master regional data center 104 assigned to such a given data item, for example. Geographically distributed database 101 may include further additional components, without departing from the scope of claimed subject matter.

At action 110, one or more individual data items may be assigned to a given regional data center 104, 106, or 108 portion of geographically distributed database 101. Once an individual data item is assigned to a given regional data center 104, 106, or 108, such a regional data center 104, 106, or 108 may now be considered the "master" for that individual data item. For example, regional data center 104 may be assigned at the "master" for an exemplary individual data item. As discussed above, such a master regional data center 104 may manage editing operations on individual data items assigned to that particular data center. Since individual regional data center 104, 106, or 108 may be geographically distributed, a first data item may be more efficiently edited by one of the regional data centers 104, 106, or 108 while another data item, possibly belonging to a different user, may be more efficiently edited with the master being a different of the regional data centers 104, 106, or 108. For example, such a master regional data center 104 may be selected by various methods, including, but not limited to those procedures described in U.S. application Ser. No. 11/948,221, entitled ASYNCHRONOUSLY REPLICATED DATABASE SYSTEM USING DYNAMIC MASTERSHIP, by Feng et al. However, the scope of claimed subject matter is not limited in this respect.

At action 112, an access request associated with a given data item may be received by regional data center 108. For example, such an access request may include read-type access requests and/or update type-access requests. In the example illustrated here, such an access request may be received at non-master regional data center 108 from user device 102, for example. In other examples, such an access request may be received at non-master regional data center 108 from master regional data center 104.

At action 114, a determination may be made that non-master regional data center 108 does not contain a replica copy of such a given data item. In the example illustrated here, non-master regional data center 108 may be a non-master with respect to such a data item and may not contain a replica copy of such a data item, for example. In such an instance, procedure 100 may determine whether or not to place a replica copy of such a data item at non-master regional data center 108, as will be described in greater detail below.

At action 116, access patterns may be determined for one or more data items within geographically distributed database 101. For example, such a determination of access patterns may include determining a local read rate for a given data item at non-master regional data center 108. As used herein the term "local read rate" may refer to a quantification of the amount of access associated with a given data item at non-master regional data center 108. As will be described in greater detail below, distribution of data items within geographically distributed database 101 may be modified based at least in part on such a determination of access patterns. In the example illustrated here, distribution of data items within geographically distributed database 101 may be modified in order to assign a replica copy of a given data item to non-master regional data center 108, such as in cases where repeated access requests at non-master regional data center 108 justify utilizing the computational resources required to maintain such a replica copy of a given data item at non-master regional data center 108.

At action 117, a check may be made to determine which of the regional data centers 104, 106, and/or 108 are currently assigned as the master to such a given data item. In the example illustrated here, non-master regional data center 108 does not contain a replica copy of such a given data item. However, non-master regional data center 108 may have a "stub" of such a given data item. As used herein, the term "stub" may refer to a partial copy of such a given data item which may indicate regional data centers that have replica copies of such a given data item at any given time, and/or may indicate a regional data center assigned as the master to such a given data item. For example, if a given data item is read or written from non-master regional data center 108 that does not have a replica copy of such a given data item, procedure 100 may utilize information in such a stub to determine an appropriate regional data center to forward such an access request to. Accordingly, such a given data item may be transmitted to a user from geographically distributed database 101, even in cases where an access request is sent to a non-master regional data center 108 that does not have a replica copy of such a given data item.

At action 118, a modification of distribution of such data items may include sending a request for a replica copy of a given data item from non-master regional data center 108 to master regional data center 104. For example, sending such a request for a replica copy may be based at least in part on such a local read rate, as discussed above.

At action 120, such a request for a replica copy of a given data item from non-master regional data center 108 to master regional data center 104 may be considered in view of a replica placement constraint. Here, procedure 100 may be capable of adaptive replication of data items within a geographically distributed database that may to reduce overall resource consumption in terms of network and/or disk bandwidth. Such adaptive replication may be subject to constraints. As used herein the term "replica placement constraint" may refer to restrictions on associating replica copies with various individual regional data centers portions of geographically distributed database 101. For example, master regional data center 104 may consider whether or not to grant such a request for a replica copy of a given data item based at least in part on such a replica placement constraint. In the example illustrated here, in addition to considering a local read rate during modification of distribution of data items within geographically distributed database 101, procedure 100 may also consider replica placement constraints. For example, master regional data center 104 may make a decision regarding such a request for a replica copy of a given data item based at least in part on taking into account replica placement constraint, such as global constraints on replica copy locations. For example, a policy may specify a minimum number of replica copies for individual data items for redundancy, and/or specify that a record may not be replicated at a given regional data center for legal reasons. In such a case, master regional data center 104 may enforce such constraints by refusing such a request for a replica copy of a given data item.

At action 122, a modification of distribution of such data items may include sending a replica copy of a given data item from master regional data center 104 to non-master regional data center 108. As discussed above, sending such a replica copy from master regional data center 104 may be based at least in part on such a replica placement constraint.

At action 124, an update to records of such a data item may be made. For example, master regional data center 104 may contact regional data centers 106 and/or 108 to provide an update reflecting modifications to the distribution of such data items. In the example illustrated here, a replica copy of a given data item may have been sent to non-master regional data center 108. In such a case, master regional data center 104 may contact regional data centers 106 and/or 108 to provide an update reflecting such a placement of a replica copy of a given data item at non-master regional data center 108. For example, master regional data center 104 may contact regional data centers 106 and/or 108 based at least in part on a current list of regional data centers that have a replica copy of the given data item. Accordingly, master regional data center 104 may avoid contacting regional data centers that do not currently have a replica copy of the given data item, thereby potentially reducing resource consumption.

Figure 2:
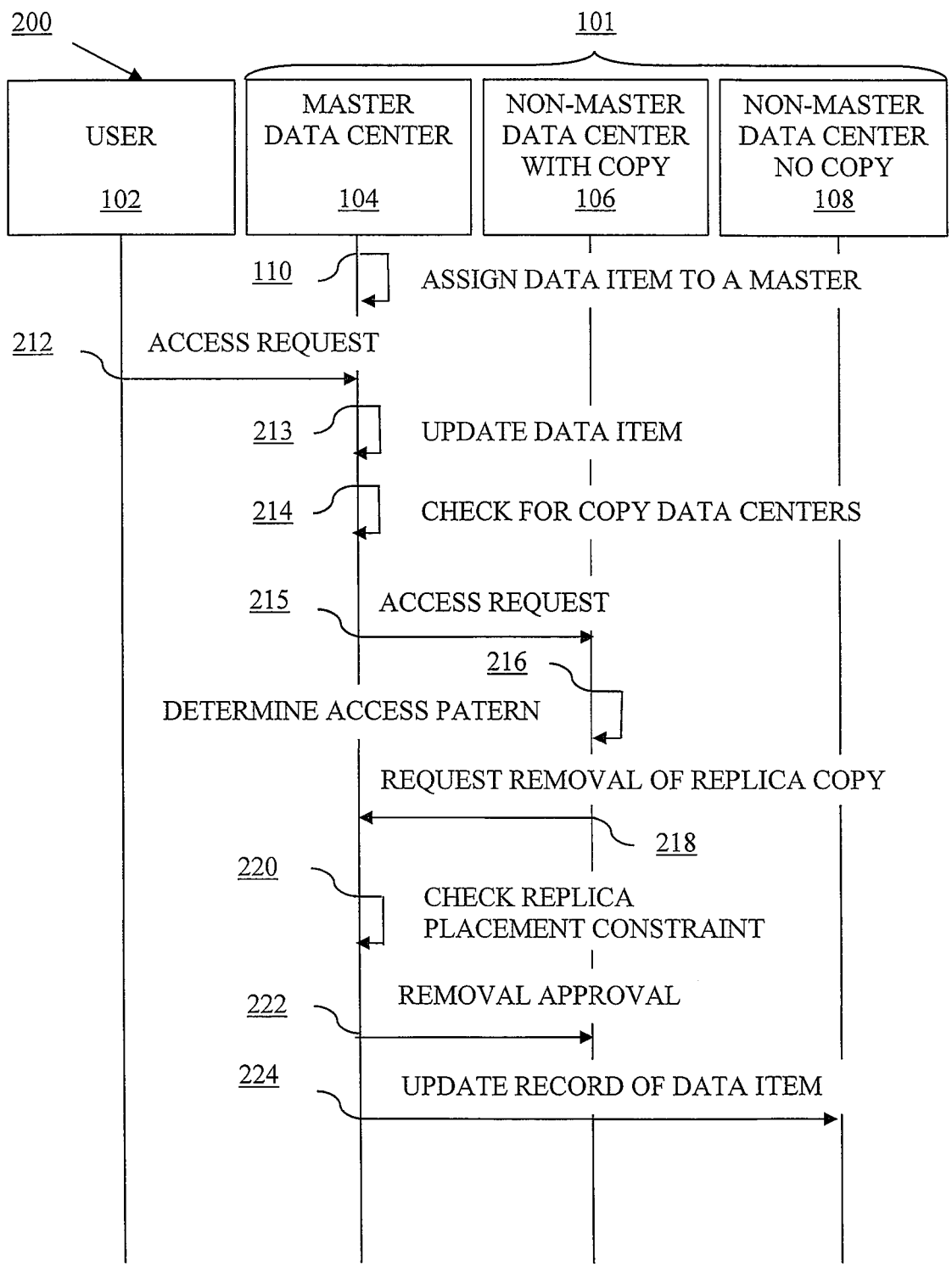
FIG. 2 is a procedure for modifying distribution of data items within a geographically distributed database in accordance with one or more exemplary embodiments.

FIG. 2 is an illustrative flow diagram of a process 200 which may be utilized for modifying distribution of data items within a geographically distributed database in accordance with some embodiments of the invention. Additionally, although procedure 200, as shown in FIG. 2, comprises one particular order of actions, the order in which the actions are presented does not necessarily limit claimed subject matter to any particular order. Likewise, intervening actions not shown in FIG. 2 and/or additional actions not shown in FIG. 2 may be employed and/or actions shown in FIG. 2 may be eliminated, without departing from the scope of claimed subject matter. Procedure 200 depicted in FIG. 2 may in alternative embodiments be implemented in software, hardware, and/or firmware, and may comprise discrete operations.

As illustrated, procedure 200 governs the operation of a geographically distributed database 101 associated with a user device 102. At action 212, an access request associated with a given data item may be received by master regional data center 104. For example, such an access request may include read-type access requests and/or update type-access requests. In the example illustrated here, such an access request may be received at master regional data center 104 from user device 102, for example. In other examples, such an access request may be received at master regional data center 104 from non-master regional data centers 106 and/or 108.

At action 213, a given data item may be updated at master regional data center 104 based at least in part on an update type-access requests. At action 214, an update to records of such a given data item may be made. For example, master regional data center 104 may contact non-master regional data center 106 to provide an update reflecting changes to such a given data item. In the example illustrated here, a replica copy of a given data item at non-master regional data center 106 may be updated based on changes made at master regional data center 104. In such a case, master regional data center 104 may contact regional data center 106 based at least in part on a current list of regional data centers that have a replica copy of the given data item. Accordingly, master regional data center 104 may avoid contacting regional data centers that do not currently have a replica copy of the given data item (such as non-master regional data center 108), thereby potentially reducing resource consumption.

At action 215, an access request associated with a given data item may be received by regional data center 106. For example, such an access request may include read-type access requests and/or update type-access requests. In the example illustrated here, such an access request may be received at non-master regional data center 106 from master regional data center 104. In other examples, such an access request may be received at non-master regional data center 106 from user device 102, for example.

At action 216, access patterns may be determined for one or more data items within geographically distributed database 101. For example, such a determination of access patterns may include determining a value function for a given data item at non-master regional data center 106. As used herein the term "value function" may refer to an association of read rate, update rate, and/or read count for individual data items that may be capable of quantifying which replica copies may be least likely to negatively impact latency in responses from non-master regional data center 106 in response to existing access patterns. For example, procedure 200 may compute such a value function for individual replica copies. Such a value function may be utilized to sort individual replica copies at individual regional data centers in terms of order of importance. As mentioned, such a value function may be computed as a function of update rate, read rate and/or read count for the replica copy. Additionally or alternatively, a running estimate of a quantile of this value function may be maintained to make decisions on replica copy placement.

Further, procedure 200 may be capable of adaptive replication of data items within a geographically distributed database that may to reduce overall resource consumption in terms of network and/or disk bandwidth. Such adaptive replication may be subject to constraints. For example, a latency constraint, may be specified so that at least a specified fraction of user access requests from a given regional data center may be served from within that regional data center without forwarding to a remote regional data center. Accordingly, such a value function may be associated with a latency constraint. As used herein the term "latency constraint" may refer to a quantification of a portion of access requests served from an individual regional data center. For example, such a latency constraint associated with non-master regional data center 106 may specify a portion of data items at a given regional data center that may only have a stub record, instead of a replica copy. For example, a latency constraint may be set so at least 90% of all access requests must be served locally without forwarding. In such a case, for example, if the local latency constraint specifies that 90% of requests must be served locally, the 10% of replica copies which exceed the 10%-quantile of the value function may be discarded if this helps reduce resource consumption. The choice of value function may be made so as to carefully to choose the replica copies to discard to reduce resource consumption.

As will be described in greater detail below, distribution of data items within geographically distributed database 101 may be modified based at least in part on such a determination of access patterns. In conjunction, such a value function may rank those existing replica copies, that if discarded, might have a minimal impact on performance, while such a latency constrain may determine if the overall number of replica copies at a given regional data center exceed a specified limit. In the example illustrated here, distribution of data items within geographically distributed database 101 may be modified in order to remove a replica copy of a given data item from non-master regional data center 106, such as in cases where the level of access requests at non-master regional data center 106 may not justify utilizing the computational resources required to maintain such a replica copy of a given data item at non-master regional data center 106.

At action 218, a modification of distribution of such data items may include sending a request to remove a replica copy of a given data item from non-master regional data center 106 to master regional data center 104. For example, sending such a request to remove a replica copy may be based at least in part on a latency constraint associated with such a value function, as discussed above.

At action 220, such a request to remove a replica copy of a given data item from non-master regional data center 106 to master regional data center 104 may be considered in view of a replica placement constraint. For example, master regional data center 104 may consider whether or not to grant such a request to remove a replica copy of a given data item based at least in part on a replica placement constraint. In the example illustrated here, in addition to considering a value function and/or latency constraint during modification of distribution of data items within geographically distributed database 101, procedure 200 may also consider replica placement constraints. For example, master regional data center 104 may make a decision regarding such a request to remove a replica copy of a given data item based at least in part on taking into account replica placement constraint, such as global constraints on replica copy locations. For example, if a policy requires that a minimum of number of copies of a data item exists, and/or that a record may not be replicated at a given regional data center for legal reasons, then master regional data center 104 may enforce such constraints by refusing such a request to remove a replica copy of a given data item.

At action 222, a modification of distribution of such data items may include sending approval for removal of such a replica copy of a given data item from master regional data center 104 to non-master regional data center 106. As discussed above, sending such an approval for removal of such a replica copy from master regional data center 104 may be based at least in part on such a replica placement constraint.

At action 224, an update to records of such a data item may be made. For example, master regional data center 104 may contact regional data centers 106 and/or 108 to provide an update reflecting modifications to the distribution of such data items. In the example illustrated here, a replica copy of a given data item may have been removed from non-master regional data center 106. In such a case, master regional data center 104 may contact regional data centers 106 and/or 108 to provide an update reflecting such a removal of a replica copy of a given data item at non-master regional data center 106. For example, master regional data center 104 may contact regional data centers 106 and/or 108 based at least in part on a current list of regional data centers that have a stub record of the given data item which may track those regional data centers that have replica copies of a given data item. Accordingly, master regional data center 104 may avoid contacting regional data centers that currently have a replica copy of the given data item, thereby potentially reducing resource consumption.

In operation procedures 100 and/or 200, alone or in combination, may facilitate individual regional data centers to make local decisions to request, maintain or request removal of replica copies on a per-data item basis. Decisions may be triggered in response to one of several events. In a first example, a request for a given data item may find a stub and may be forwarded to another regional data center. In this situation, the forwarding regional data centers (see regional data centers 108 of FIG. 1, for example) may want to create a replica copy of the data item to serve future requests with low latency. The regional data center may consult its replication policy to determine if it should request a copy of this data item. For example, such a regional data center may determine if it should request a copy of this data item based at least in part on local read rate of this data item. In a second example, an update for a given data item may be received by a non-master regional data center from the master regional data center for this data item. In this case, the non-master regional data center (see regional data center 106 of FIG. 2, for example) receiving the update may want to delete its replica copy of the data item in order to reduce resource consumption in the form of network or disk bandwidth. The non-master regional data center may consult its replication policy to determine if it should delete its replica copy of the data item. For example, such a regional data center may determine if it should request removal of its replica copy of this data item based at least in part on a latency constraint associated with a value function of this data item.

Such procedures 100 and/or 200 may maintain both the overall update rate for individual data items, and/or the local read rate for individual data items in individual regional data centers. While such update rates may be co-located with replica copies of a data item and updated on disk with individual replica copy updates, procedures 100 and/or 200 may maintain approximate read costs or sizes, as well as approximate read counts based at least in part on utilizing a space-efficient in-memory data structure. For example, update and/or read rates may be maintained over sliding windows to reflect the recent statistics for each item.

In one example, a geographically distributed database table T which may be conceptually considered as a set of data items x may live in a set of geographic locations L. There may be a (symmetric) cost matrix C, where $C_{i,j}$ denotes the price of bandwidth between locations $i \in L$ and $j \in L$. It may be possible to modify the formulation for the case when, rather than bandwidth, the quantity being optimized is disk seek capacity at the receiver.

For individual data item x, the following kinds of statistics may be defined. Such statistics may form the input to adaptive replication by procedure 100 and/or procedure 200. Such statistics may include a read rate (in terms of bytes) $r_l(x)$ from location l; an update rate (in bytes) $u_l(x)$ from l; and/or a read count (such as frequency, for example) $f_l(x)$ from l.

Adaptive replication by procedure 100 and/or procedure 200 may produce output values for two sets of variables. First, a master for individual data items may be determined. Here, $m_l(x) \in 0, 1$ may denote an indicator variable whether data item x is mastered in location l. Second, the locations where individual data items are replicated may be determined. Here, $i_l(x) \in 0, 1$ may denote whether data item x is replicated at location l.

There may be two main constraints to enforce in either procedure 100 and/or procedure 200. Regarding the latency constraint, at individual storage units within individual regional data centers, at least a fraction p ($0 < p < 1$) of access requests may be served locally. Note that such a latency constraint may be applied per regional data center; however, applying such a latency constraint per storage unit within individual regional data centers may be easier to enforce. Regarding the replica placement constraint, individual data items may be controlled so as to have at least k copies in different locations for k-safety. In other words, such a replica placement constraint may be capable of tolerating up to k−1 regional data center failures. Additionally or alternatively, there may be an implicit constraint that $m_l(x) \rightarrow i_l(x)$, namely that a full copy of a data item may be located in its master regional data center. This may be utilized to maintain consistency in such a geographically distributed database implementation.

Given the above constraints, the overall bandwidth consumed may be minimized via procedure 100 and/or procedure 200. The bandwidth consumed may involve several components. One such component involves a cost of fetching read results from the master regional data center for locations which do not have a replica copy (i.e. l, x for which $i_l(x)=0$). Another such component involves a cost of applying updates from the master regional data center to all locations which have a full replica copy (i.e. l, x for which $i_l(x)=1$). A further such component involves a cost of forwarding updates to the master regional data center from all other locations from which the data item may be updated.

From the above description, the following formulation may be utilized for adaptive replication as an integer programming (IP) optimization problem. For example the following IP formulation may be minimized:

$$\sum_{l,l',x} r_l(x) \cdot (1 - i_l(x)) \cdot m_{l'}(x) \cdot C_{l,l'} \text{ (Cost of fetching reads)} +$$

$$\sum_{l,l',x} u(x) \cdot i_l(x) \cdot m_{l'}(x) \cdot C_{l,l'} \text{ (Cost of applying updates)} +$$

$$\sum_{l,l',x} u_l(x) \cdot m_{l'}(x) \cdot C_{l,l'} \text{ (Cost of forwarding updates)},$$

where $$u(x) = \sum_{l \in L} u_l(x),$$

subject to the following constraints:

$$\forall x \sum_l m_l(x) = 1 \text{ (Only one record master)}$$

$$\forall x \sum_l i_l(x) \geq k \text{ (Redundancy constraint for } k\text{-safety)}$$

$$\forall x \, m_l(x) \cdot (1 - i_l(x)) = 0 \text{ (Master must have record copy)}$$

$$\forall l \sum_x f_l(x) \cdot i_l(x) \geq p \sum_x f_l(x) \text{ (Latency constraint)}$$

The above IP formulation may be analyze by assuming that finding a master regional data center associated with a data item is external to the IP formulation, and/or by assuming that a goal is to determine the replica copy locations given the current master regional data center associated with a data item. Such an analysis of the above IP formulation may proceed in several stages. First, it may be shown that if for a given data item, bandwidth consumed for remote reads would exceed update bandwidth cost, it may be better to keep a replica copy of the data item. Such may be the case in situations described above with respect to procedure 100.

Second, the IP formulation may be considered without replica placement constraints. In such a case, it may be shown that the IP formulation may essentially be reduced to a "knapsack problem". As used herein the term "knapsack problem" may refer to a problem including one or more data items (or a "sack" of data items) that can be throw out from an individual regional data center. For example, around to 5 or 10% of data items, given by a latency constraint, may be eligible to be thrown out. In such a case, it may be desired to throw out those data items on which an increased amount of bandwidth may be saved. Such may be the case in situations described above with respect to procedure 200. In such a case, the IP formulation may be resolved where a key result is that individual regional data centers may sort its data items in descending order based at least in part on a value function V given by:

$$V=(u-r)/f$$

where u and r refer to update and remote read costs, and f refers to the read frequency, for example. Once sorted, a regional data center may throw out data items in the specified percentile based at least in part on the latency constraint.

Third, the IP formulation may be considered by incorporating replica placement constraints. The IP formulation may be analyzed to show that given particular statistics, it may be still possible to make entirely distributed decisions which constitute a "good" greedy approach to solving the IP formulation.

In operation, procedure 100 may facilitate individual regional data centers to request to add a replica copy whenever such a regional data center has just had to forward a request to another regional data center because it did not have a replica copy. For example, such a request to add a replica copy may be issued as an "add replica" request (and/or the like) to the current master regional data center associated with a given data item. Additionally, in operation, procedure 200 may facilitate individual regional data centers to request to remove a replica copy whenever such a regional data center has just had to apply an update for this data item, and such a regional data center is not the current master regional data center. Such a regional data center may issue a "remove replica" request to the master regional data center associated with a given data item. As discussed above, the master regional data center associated with a given data item may reject such "remove replica" requests in situations where removing the replica copy would violate the replica placement constraint of k-safety. In such a case, the current master regional data center associated with a given data item may typically have the most recent map of replica copies for individual data items.

Such requests to add and/or remove replica copies may be "soft," so as to be capable of being ignored by the master regional data center associated with a given data item. For example, a non-master regional data center may add and/or remove replica copies only after the master regional data center associated with a given data item sends a confirmation message. In such a case, the master regional data center may send either a sync message for an adding of replica copies, or a remove replica copy message for removal of replica copies. Making such requests "soft" permits procedures 100 and/or 200 to continue to work in the face of mastership changes. For example, if mastership changed in flight and a previous master regional data center associated with a given data item gets an add or remove request, such a previous master regional data center can drop such a request safely because such a previous master regional data center may no longer be responsible for adding/removing replica copies.

In practice, predicting future update, read rates and/or read frequencies for all data item may be difficult to do. As discussed above, update and/or read rates may be maintained over sliding windows to reflect the recent statistics for each item. For updates, some semblance of sliding window rates may be maintained as a metadata field in a data item. Such sliding window rates may be updated during updating of a data item. For reads, a disk update may not be applied for individual reads as this may reduce the system capacity of a geographically distributed database. Accordingly, read statistics may be tracked in-memory. However, since it may be desirable to use memory for cache, the memory available for stats may be somewhat limited. In such a case, approximate sliding window counts and size sums (rates) may be maintained for reads using a limited memory buffer, and/or a running estimate of a specified percentile of the value function V may be maintained over some and/or all data item reads, where V is defined above.

Figure 3:
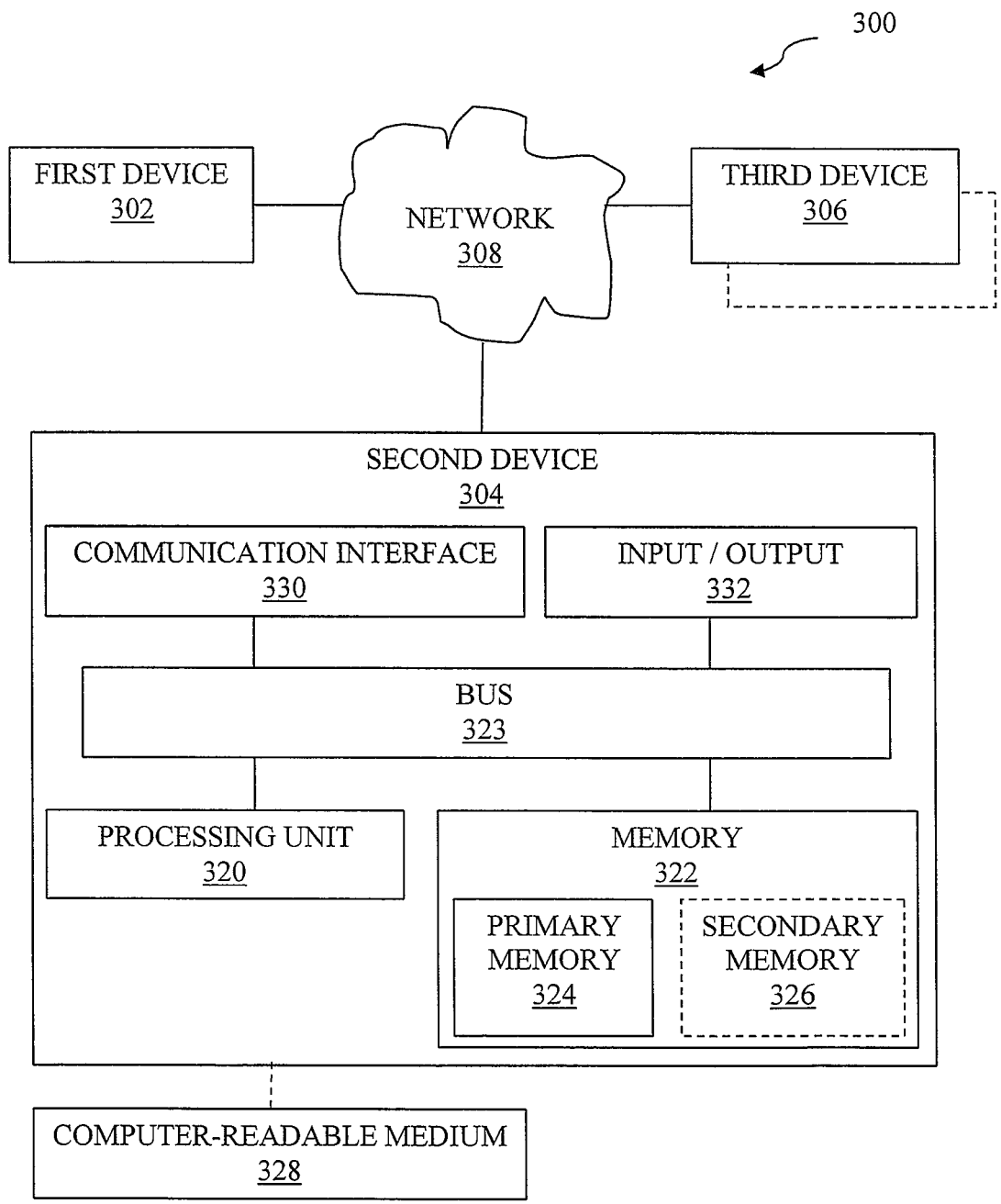
FIG. 3 is a block diagram illustrating an embodiment of a computing environment system in accordance with one or more exemplary embodiments.

FIG. 3 is a block diagram illustrating an exemplary embodiment of a computing environment system 300 that may include one or more devices configurable to distribute data items within geographically distributed databases using one or more exemplary techniques illustrated above. For example, computing environment system 300 may be operatively enabled to perform all or a portion of process 100 of FIG. 1 and/or process 200 of FIG. 2.

Computing environment system 300 may include, for example, a first device 302, a second device 304 and a third device 306, which may be operatively coupled together through a network 308.

First device 302, second device 304 and third device 306, as shown in FIG. 3, are each representative of any device, appliance or machine that may be configurable to exchange data over network 308. By way of example, but not limitation, any of first device 302, second device 304, or third device 306 may include: one or more computing platforms or devices, such as, e.g., a desktop computer, a laptop computer, a workstation, a server device, storage units, or the like.

In the context of this particular patent application, the term "special purpose computing platform" means or refers to a general purpose computing platform once it is programmed to perform particular functions pursuant to instructions from program software. By way of example, but not limitation, any of first device 302, second device 304, or third device 306 may include: one or more special purpose computing platforms once programmed to perform particular functions pursuant to instructions from program software. Such program software does not refer to software that may be written to perform process 100 of FIG. 1 and/or process 200 of FIG. 2. Instead, such program software may refer to software that may be executing in addition to and/or in conjunction with all or a portion of process 100 of FIG. 1 and/or process 200 of FIG. 2.

Network 308, as shown in FIG. 3, is representative of one or more communication links, processes, and/or resources configurable to support the exchange of data between at least two of first device 302, second device 304 and third device 306. By way of example, but not limitation, network 308 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated by the dashed lined box partially obscured behind third device 306, there may be additional like devices operatively coupled to network 308, for example.

It is recognized that all or part of the various devices and networks shown in system 300, and the processes and methods as further described herein, may be implemented using or otherwise include hardware, firmware, software, or any combination thereof.

Thus, by way of example, but not limitation, second device 304 may include at least one processing unit 320 that is operatively coupled to a memory 322 through a bus 323.

Processing unit 320 is representative of one or more circuits configurable to perform at least a portion of a data computing procedure or process. By way of example, but not limitation, processing unit 320 may include one or more processors, controllers, microprocessors, microcontrollers, application specific integrated circuits, digital signal processors, programmable logic devices, field programmable gate arrays, and the like, or any combination thereof.

Memory 322 is representative of any data storage mechanism. Memory 322 may include, for example, a primary memory 324 and/or a secondary memory 326. Primary memory 324 may include, for example, a random access memory, read only memory, etc. While illustrated in this example as being separate from processing unit 320, it should be understood that all or part of primary memory 324 may be provided within or otherwise co-located/coupled with processing unit 320.

Secondary memory 326 may include, for example, the same or similar type of memory as primary memory and/or one or more data storage devices or systems, such as, for example, a disk drive, an optical disc drive, a tape drive, a solid state memory drive, etc. In certain implementations, secondary memory 326 may be operatively receptive of, or otherwise configurable to couple to, a computer-readable medium 328. Computer-readable medium 328 may include, for example, any medium that can carry and/or make accessible data, code and/or instructions for one or more of the devices in system 300.

Second device 304 may include, for example, a communication interface 330 that provides for or otherwise supports the operative coupling of second device 304 to at least network 308. By way of example, but not limitation, communication interface 330 may include a network interface device or card, a modem, a router, a switch, a transceiver, and the like.

Second device 304 may include, for example, an input/output 332. Input/output 332 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 332 may include an operatively enabled display, speaker, keyboard, mouse, trackball, touch screen, data port, etc.

Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method, comprising:
   determining access patterns for one or more data items within a geographically distributed database via a computing platform based at least partially on a number of read-type access requests of said one or more data items, wherein said geographically distributed database is mapped to store said one or more data items in a set of data centers comprising at least a first data center and a second data center; and
   modifying distribution of said one or more data items within said set of data centers of said geographically distributed database based at least in part on said determination of access patterns, wherein said modifying distribution comprises removing at least one of said one or more data items from said first data center and adding said at least one or more data items to said second data center at least partially in response to a determination of one or more locations from which one or more recent updates of said at least one of said one or more data items have originated;
   assigning individual data items to a master regional data center, wherein said geographically distributed database comprises two or more regional data centers;
   receiving an access request for a given data item at a second regional data center;
   determining that said second regional data center does not contain a replica copy of said given data item;
   wherein said determination of access patterns comprises determining a local read rate for said given data item at said second regional data center; and
   wherein said modification of distribution of said one or more data items comprises sending a request for a replica copy of said given data item from said second regional data center to said master regional data center based at least in part on said local read rate.

2. The method of claim 1, further comprising transmitting at least one of said one or more data items to a user from said geographically distributed database.

3. The method of claim 1, wherein said access patterns are further determined based at least in part on update type-access requests.

4. The method of claim 1, wherein said modification of distribution of said one or more data items comprises sending a request for a replica copy of a given data item from a second regional data center portion of said geographically distributed database to a master regional data center portion of said geographically distributed database based at least in part on a local read rate associated with said given data item at said second regional data center.

5. The method of claim 1, wherein said modification of distribution of said one or more data items comprises sending a replica copy of a given data item from a master regional data center portion of said geographically distributed database to a second regional data center portion of said geographically distributed database based at least in part on a replica placement constraint, wherein said replica placement constraint comprises restrictions on associating replica copies with portions of said geographically distributed database.

6. The method of claim 1, wherein said determination of access patterns comprises determining a value function for a given data item at a second regional data center portion of said geographically distributed database, and wherein said modification of distribution of said one or more data items comprises sending a request to remove a replica copy of said given data item from said second regional data center to a master regional data center portion of said geographically distributed database based at least in part on a latency constraint associated with said value function.

7. The method of claim 1, wherein said determination of access patterns comprises determining a value function for a given data item at a second regional data center portion of said geographically distributed database, wherein said value function comprises an association of read rate, update rate, and/or read count for individual data items.

8. The method of claim 1,
   wherein said modification of distribution of said one or more data items further comprises sending a replica copy of said given data item from said master regional data center to said second regional data center based at least in part on a replica placement constraint, wherein said replica placement constraint comprises restrictions on associating replica copies with individual regional data centers.

9. The method of claim 1, further comprising:
   wherein said determination of access patterns comprises determining a value function for said given data item at said second regional data center; and
   wherein said modification of distribution of said one or more data items comprises sending a request to remove a replica copy of said given data item from said second regional data center to said master regional data center further based at least in part on a latency constraint associated with said value function.

10. The method of claim 1, further comprising:
wherein said determination of access patterns comprises determining a value function for said given data item at said second regional data center;
wherein said modification of distribution of said one or more data items comprises sending a request to remove a replica copy of said given data item from said second regional data center to said master regional data center further based at least in part on a latency constraint associated with said value function; and
wherein said modification of distribution of said one or more data items further comprises sending approval for removal of said replica copy of said given data item from said master regional data center to said second regional data center based at least in part on a replica placement constraint.

11. The method of claim 1, further comprising:
wherein said determination of access patterns comprises determining a value function for said given data item at said second regional data center, wherein said value function comprises an association of read rate, update rate, and/or read count for individual data items;
wherein said modification of distribution of said one or more data items comprises sending a request to remove a replica copy of said given data item from said second regional data center to said master regional data center further based at least in part on a latency constraint associated with said value function, wherein said latency constraint comprises a quantification of a portion of access requests served from an individual regional data center; and
wherein said modification of distribution of said one or more data items further comprises sending approval for removal of said replica copy of said given data item from said master regional data center to said second regional data center based at least in part on a replica placement constraint, wherein said replica placement constraint comprises a quantification of a minimum number of data item replications within said geographically distributed database.

12. The method of claim 1, further comprising:
wherein said modification of distribution of said one or more data items further comprises sending a replica copy of said given data item from said master regional data center to said second regional data center based at least in part on a replica placement constraint, wherein said replica placement constraint comprises restrictions on associating replica copies with individual regional data centers;
receiving a second access request for said given data item at a second regional data center;
wherein said determination of access patterns comprises determining a value function for said given data item at said second regional data center, wherein said value function comprises an association of read rate, update rate, and/or read count for individual data items;
wherein said modification of distribution of said one or more data items further comprises sending a request to remove said replica copy of said given data item from said second regional data center to said master regional data center based at least in part on a latency constraint associated with said value function, wherein said latency constraint comprises a quantification of a portion of access requests served from an individual regional data center; and
wherein said modification of distribution of said one or more data items further comprises sending approval for removal of said replica copy of said given data item from said master regional data center to said second regional data center based at least in part on a replica placement constraint, wherein said replica placement constraint comprises a quantification of a minimum number of data item replications within said geographically distributed database.

13. An article comprising:
a non-transitory storage medium comprising machine-readable instructions stored thereon which are executable by one or more processors to:
determine access patterns for one or more data items within a geographically distributed database based at least partially on a number of read-type access requests of said one or more data items, wherein said geographically distributed database is mapped to store said one or more data items in a set of data centers comprising at least a first data center and a second data center;
modify distribution of said one or more data items within said set of data centers of said geographically distributed database based at least in part on said determination of access patterns, wherein said modify distribution comprises removing at least one of said one or more data items from said first data center and adding said at least one of said one or more data items to said second data center at least partially in response to a determination of one or more locations from which one or more recent updates of said at least one of said one or more data items have originated;
assign individual data items to a master regional data center, wherein said geographically distributed database comprises two or more regional data centers;
receive an access request for a given data item at a second regional data center;
determine that said second regional data center does not contain a replica copy of said given data item;
wherein said determination of access patterns comprises determining a local read rate for said given data item at said second regional data center; and
wherein said modification of distribution of said one or more data items comprises sending a request for a replica copy of said given data item from said second regional data center to said master regional data center based at least in part on said local read rate.

14. The article of claim 13, wherein said modification of distribution of said one or more data items further comprises initiation of transmission of a request for a replica copy of a given data item from a second regional data center portion of said geographically distributed database to a master regional data center portion of said geographically distributed database based at least in part on a local read rate associated with said given data item at said second regional data, center.

15. The article of claim 13, wherein said modification of distribution of said one or more data items further comprises initiation of transmission of a replica copy of a given data item from a master regional data center portion of said geographically distributed database to a second regional data center portion of said geographically distributed database based at least in part on a replica placement constraint, wherein said replica placement constraint comprises restrictions on associating replica copies with portions of said geographically distributed database.

16. The article of claim 13, wherein said determination of access patterns further comprises determination of a value function for a given data item at a second regional data center portion of said geographically distributed database, wherein said value function comprises an association of read rate, update rate, and/or read count for individual data items, and wherein said modification of distribution of said one or more data items comprises operatively enabling the computing platform to send a request to remove a replica copy of said given data item from said second regional data center to a master regional data center portion of said geographically distributed database based at least in part on a latency constraint associated with said value function.

17. An apparatus comprising:

a computing platform comprising one or more processors to:

determine access patterns for one or more data items within a geographically distributed database based at least partially on a number of read-type access requests of said one or more data items, wherein said geographically distributed database is mapped to store said one or more data items in a set of data centers comprising at least a first data center and a second data center;

modify distribution of said one or more data items within said set of data centers of said geographically distributed database based at least in part on said determination of access patterns, wherein said modify distribution comprises removing at least one of said one or more data items from said first data center and adding said at least one of said one or more data items to said second data center at least partially in response to a determination of one or more locations from which one or more recent updates of said at least one of said one or more data items have originated;

assign individual data items to a master regional data center, wherein said geographically distributed database comprises two or more regional data centers;

receive an access request for a given data item at a second regional data center;

determine that said second regional data center does not contain a replica copy of said given data item;

wherein said determination of access patterns comprises determining a local read rate for said given data item at said second regional data center; and wherein said modification of distribution of said one or more data items comprises sending a request for a replica copy of said given data item from said second regional data center to said master regional data center based at least in part on said local read rate.

18. The apparatus of claim 17, wherein said modification of distribution of said one or more data items further comprises:

initiation of transmission of a request for a replica copy of a given data item from a second regional data center portion of said geographically distributed database to a master regional data center portion of said geographically distributed database based at least in part on a local read rate associated with said given data item at said second regional data center; and initiation of transmission of said replica copy of a given data item from said master regional data center portion of said geographically distributed database to said second regional data center portion of said geographically distributed database based at least in part on a replica placement constraint, wherein said replica placement constraint comprises restrictions on associating replica copies with portions of said geographically distributed database.

19. The apparatus of claim 17, wherein said determination of access patterns further comprises determination of a value function for a given data item at a second regional data center portion of said geographically distributed database, wherein said value function comprises an association of read rate, update rate, and/or read count for individual data items, and wherein said modification of distribution of said one or more data items comprises operatively enabling the computing platform to send a request to remove a replica copy of said given data item from said second regional data center to a master regional data center portion of said geographically distributed database based at least in part on a latency constraint associated with said value function.

20. The method of claim 1, wherein said modifying distribution of said one or more data items further comprises:

removing a first data item from a first data center and adding said first data item to a second data center based at least in part on access patterns of said first data item; and removing a second data item from said first data center and adding said second data item to a third data center based at least in part on access patterns of said second data item.

* * * * *